UNITED STATES PATENT OFFICE.

ISAAC O. FOOTE, OF SIDNEY, IOWA.

LOTION.

1,427,199.  Specification of Letters Patent.  Patented Aug. 29, 1922.

No Drawing. Application filed July 14, 1919, Serial No. 310,563. Renewed January 28, 1922. Serial No. 532,501.

*To all whom it may concern:*

Be it known that I, ISAAC O. FOOTE, a citizen of the United States, and a resident of Sidney, in the county of Fremont and State of Iowa, have invented new and useful Improvements in Lotions, of which the following is a specification.

The object of my invention is to produce a lotion to be used for external application in the treatment of eczema, hives, itching piles and like diseases of the skin.

The composition consists of the following ingredients in approximately the proportions given.

| | |
|---|---|
| Spirits of camphor | 2 oz. |
| Alcohol | 2 oz. |
| Resorcin | 1 drm. |
| Epsom salts | 6 drm. |
| Saltpetre | 1 drm. |
| Carbolic acid | 40 drops. |
| Witch hazel extract | $3\frac{1}{2}$ ozs. |
| Water | $3\frac{1}{2}$ ozs. |

The preferred method of preparing the composition is to dissolve the resorcin in two ounces of water and add the Epsom salts to this solution. The spirits of camphor and alcohol are mixed and the resulting solution added to the solution of resorcin and Epsom salts and mixed well.

The remaining ingredients are dissolved in the remainng part, one and one half ounces of water, and this solution is mixed with the solution above obtained and the whole well shaken. The composition is then ready for use.

The composition is particularly adapted to the treatment of eczema but it is also useful to relieve other diseases such as itching piles, hives and insect bites.

What I claim is:

A composition of matter comprising substantially equal parts of water, witch hazel extract and a mixture of equal parts of alcohol and spirits of camphor, together with smaller proportions of resorcin, Epsom salts, salt petre and carbolic acid.

ISAAC O. FOOTE.